United States Patent
Shaw

[11] Patent Number: 6,139,029
[45] Date of Patent: Oct. 31, 2000

[54] PORTABLE UTILITY CART

[76] Inventor: James H. Shaw, 21290 SW. Kruger Rd., Sherwood, Oreg. 97140

[21] Appl. No.: 08/861,944

[22] Filed: May 29, 1997

[51] Int. Cl.[7] .................................................. B62B 19/00
[52] U.S. Cl. .......................... 280/8; 280/653; 280/47.371
[58] Field of Search .............................. 280/47.17, 47.18,
280/47.131, 653, 659, 43.1, 33.994, 33.998,
656, 655.1, 7.12, 7.14, 8, 43.24, 47.24,
47.26, 47.315, 47.371, 47.36, 655, 47.34,
47.35

[56] References Cited

U.S. PATENT DOCUMENTS

| | | | |
|---|---|---|---|
| 1,513,469 | 10/1924 | Robinson | 280/30 |
| 1,815,244 | 7/1931 | Dodge . | |
| 2,350,062 | 5/1944 | Mosier | 280/87.01 |
| 2,494,144 | 1/1950 | Restall | 280/124.128 |
| 2,902,286 | 9/1959 | Wood, Jr. | 280/31 |
| 2,938,748 | 5/1960 | Johnson | 296/27 |
| 3,236,537 | 2/1966 | Eckman | 280/47.18 |
| 3,463,504 | 8/1969 | Petry et al. | 280/31 |
| 3,679,227 | 7/1972 | Rock | 280/47.24 |
| 3,751,058 | 8/1973 | Larsen | 280/30 |
| 3,936,070 | 2/1976 | Owings | 280/47.18 |
| 3,950,004 | 4/1976 | Olsson | 280/47.18 |
| 4,199,161 | 4/1980 | Nieminen et al. | 280/8 |
| 4,223,907 | 9/1980 | Kelly | 280/408 |
| 4,253,677 | 3/1981 | Wissler | 280/40 |
| 4,261,596 | 4/1981 | Douglas | 280/652 |
| 4,266,791 | 5/1981 | Myers | 280/37 |
| 4,274,649 | 6/1981 | Vanderhorst et al. | 280/204 |
| 4,316,615 | 2/1982 | Willette | 280/47.26 |
| 4,335,897 | 6/1982 | Muller, Jr. | 280/47.18 |
| 4,375,113 | 3/1983 | Ewert | 280/47.24 |
| 4,645,225 | 2/1987 | Eubanks | 280/47.31 |
| 4,789,180 | 12/1988 | Bell | 280/652 |
| 4,873,841 | 10/1989 | Bradshaw et al. | 62/239 |
| 4,889,360 | 12/1989 | Havlovitz | 280/655.1 |
| 4,957,306 | 9/1990 | Greenberg | 280/652 |
| 4,958,846 | 9/1990 | Greenberg | 280/652 |
| 5,116,289 | 5/1992 | Pond et al. | 190/18 A |
| 5,163,694 | 11/1992 | Reichek | 280/47.26 |
| 5,263,727 | 11/1993 | Libit et al. | 280/40 |
| 5,277,449 | 1/1994 | Schmidt | 280/655 |
| 5,318,315 | 6/1994 | White et al. | 280/47.26 |
| 5,330,212 | 7/1994 | Gardner | 280/40 |
| 5,374,095 | 12/1994 | Ramseth | 296/32 |
| 5,692,761 | 12/1997 | Havlovitz | 280/33.994 |
| 5,803,472 | 9/1998 | Lien | 280/47.26 |
| 5,806,866 | 9/1998 | Fleischer | 280/47.31 |

*Primary Examiner*—Brian L. Johnson
*Assistant Examiner*—Bridget Avery
*Attorney, Agent, or Firm*—Chernoff, Vilhauer, McClung & Stenzel, LLP

[57] ABSTRACT

A multipurpose two-wheeled cart whose wheels are removable from the body of the cart to leave a generally planar flat bottom, so that the cart can be used as a sled. Side extensions may be mounted to hold bulky loads. Removable handles are provided at both of the sloping ends of the body and are adjustable to keep grips at the same height from the ground when the wheels are removed. Either or both of the handles may be mounted and used, depending on whether terrain and load make it desirable for one person or two people to move the cart and its load. The handles, wheels, and side extensions all fit within the body to provide a compact unit for transport in a motor vehicle. Stiffeners on the bottom of the body may be used as runners.

16 Claims, 4 Drawing Sheets

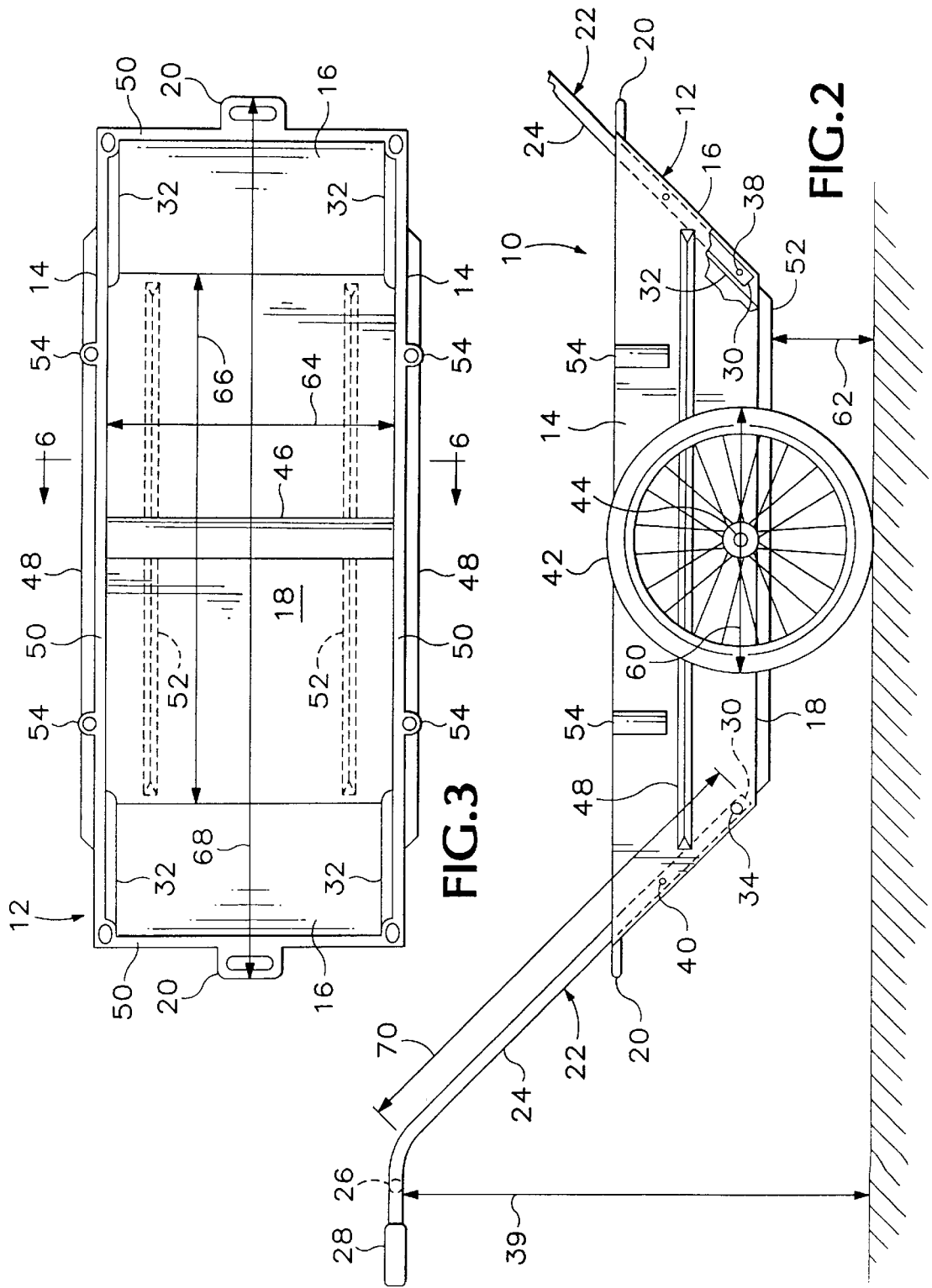

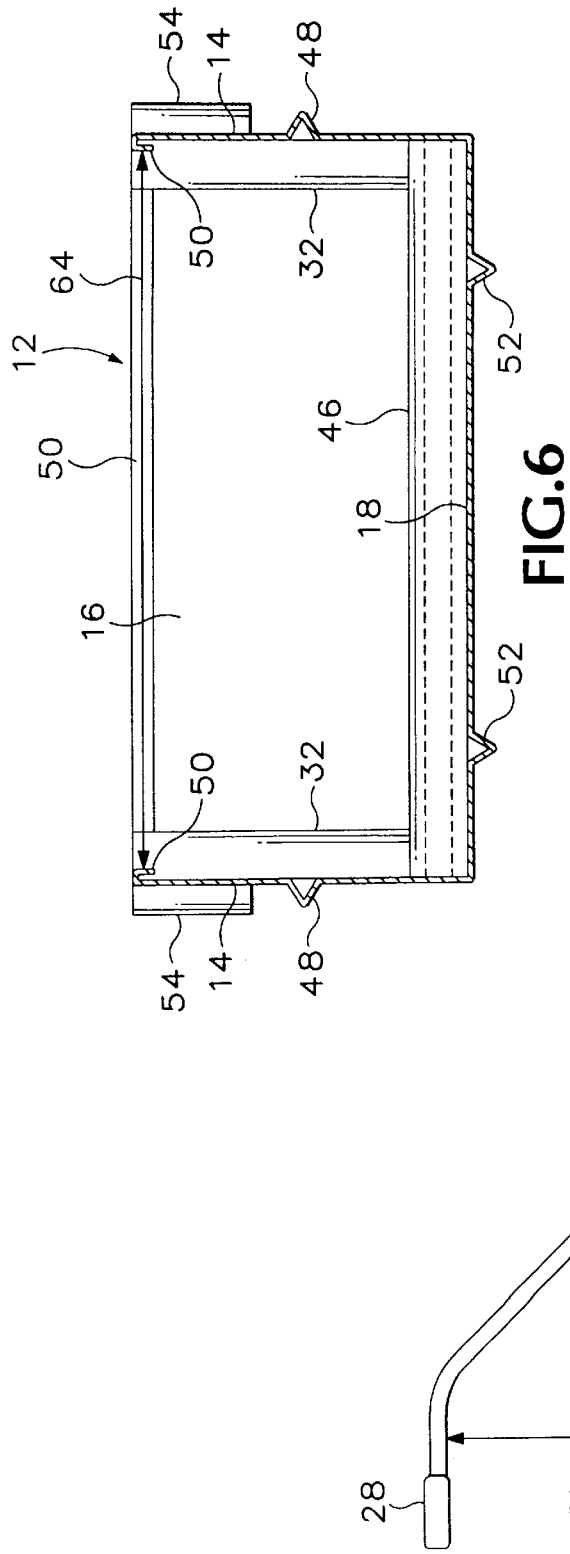
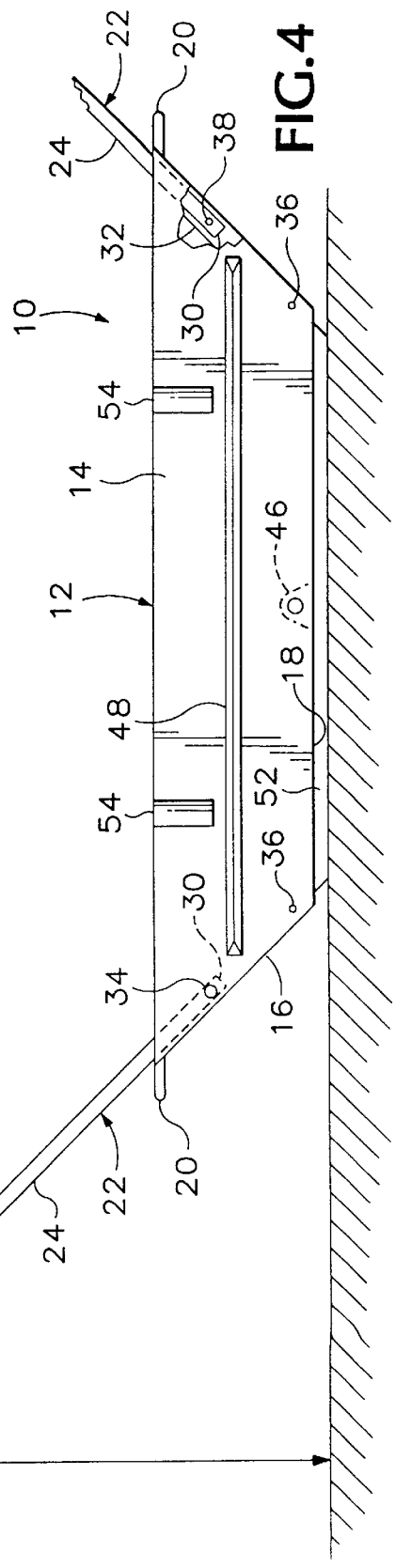

6,139,029

PORTABLE UTILITY CART

BACKGROUND OF THE INVENTION

The present invention relates to utility carts and in particular relates to a two-wheeled cart that is easily portable.

It is often desirable to move bulky items such as yard debris around a home, or to move hunting or camping equipment across rough terrain, which may include soft soil, be swampy, or be covered with snow, to a camp site. Various carts available in the past, however, have not been completely satisfactory for such uses, for various reasons.

Where heavy loads are expected to be carried it is desirable for a cart to be of sturdy construction and to include strong handles, located at a convenient height above the surface supporting the cart, in such locations that they can be used simultaneously by two people. While some such carts have been available in the past they have usually been quite heavy.

For a cart intended to be used in hunting, and particularly for moving large animals such as deer or elk after they have been shot, it is desirable for a cart to be reasonably large, yet such a cart should not be too heavy, and should be able to be configured easily as a package small enough to be placed into a vehicle such as a pick-up truck, without occupying too much of the available space.

It is desirable for a cart intended to be operated on uneven ground to have large diameter wheels, but where there is a likelihood that snow or soft ground will be encountered, a cart with large wheels may be of little use to carry objects, and a sled could be the only practical way to carry cargo easily. Simply removing the wheels from previously known carts, however, does not make them useful as sleds, since the axles or other structures used to attach wheels to some previously available carts projects beneath the cargo-box or body of such carts. In other carts, such as that disclosed in Myers U.S. Pat. No. 4,266,791, the bottom is flat, but upright ends make the body impractical as a sled when the wheels have been removed, and handles would be at an inconvenient height.

What is desired, then, is a utility cart useful for carrying loads over rough or smooth terrain, and which may be converted when desired for use as a sled to carry such loads over snow or in other locations where wheels will not provide adequate support. Such a cart should also be able to be carried or stored in a reasonably small amount of space.

SUMMARY OF THE INVENTION

The present invention overcomes the aforementioned shortcomings of the previously available utility carts and provides an answer to the need for an improved utility cart by providing a portable cart having a load-bearing body, or box, including a generally planar bottom and a pair of upwardly and outwardly sloping ends, with a pair of large diameter wheels mounted on opposite sides of the body, and easily removable. Handle receptacles are associated with at least one end of the body, with a handle fastened in the handle receptacles in a first position when the wheels are mounted on the body. The handle is movable to and can be fastened in a second position that is higher than the first position, for use when the wheels are removed from the body and the body is used as a sled.

In a preferred embodiment of the invention there are a pair of handles removably and adjustably mounted in respective receptacles at the opposite ends of the body.

In one embodiment of the invention the wheels are light, strong wheels with a large enough diameter to provide significant clearance beneath the load-bearing body of the cart, yet small enough to fit within the body of the cart when they are removed.

In a preferred embodiment of the invention the handles are about the same length as the body and fit within the body when removed from the receptacles, so that the cart can be carried within the space available in a motor vehicle, with the handles, wheels and axle stowed within the load-bearing body.

In one embodiment of the invention side-extending members are removably mounted in sockets provided on the sides of the load-bearing body to increase the cart's capacity for materials, such as yard debris, which can be carried.

A preferred embodiment of the cart includes handles having generally the shape of an "H" or a ladder, with the bar of the "H" or rungs of the ladder extending horizontally and transversely and located at a convenient height to be used as a "belly bar" in handling the cart.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 2 is a partially cutaway side elevational view of the portable utility cart shown in FIG. 1, at a slightly reduced scale.

FIG. 3 is a top plan view of the box portion of the cart shown in FIG. 1.

FIG. 4 is a partially cutaway side elevational view of the portable utility cart shown in FIGS. 1–3, configured for use as a sled.

FIG. 6 is a sectional view of an alternative embodiment of the body for the cart shown in FIG. 1, taken in the direction of the line 6—6 in FIG. 3, at an enlarged scale.

DETAILED DESCRIPTION OF THE INVENTION

Figure 1:
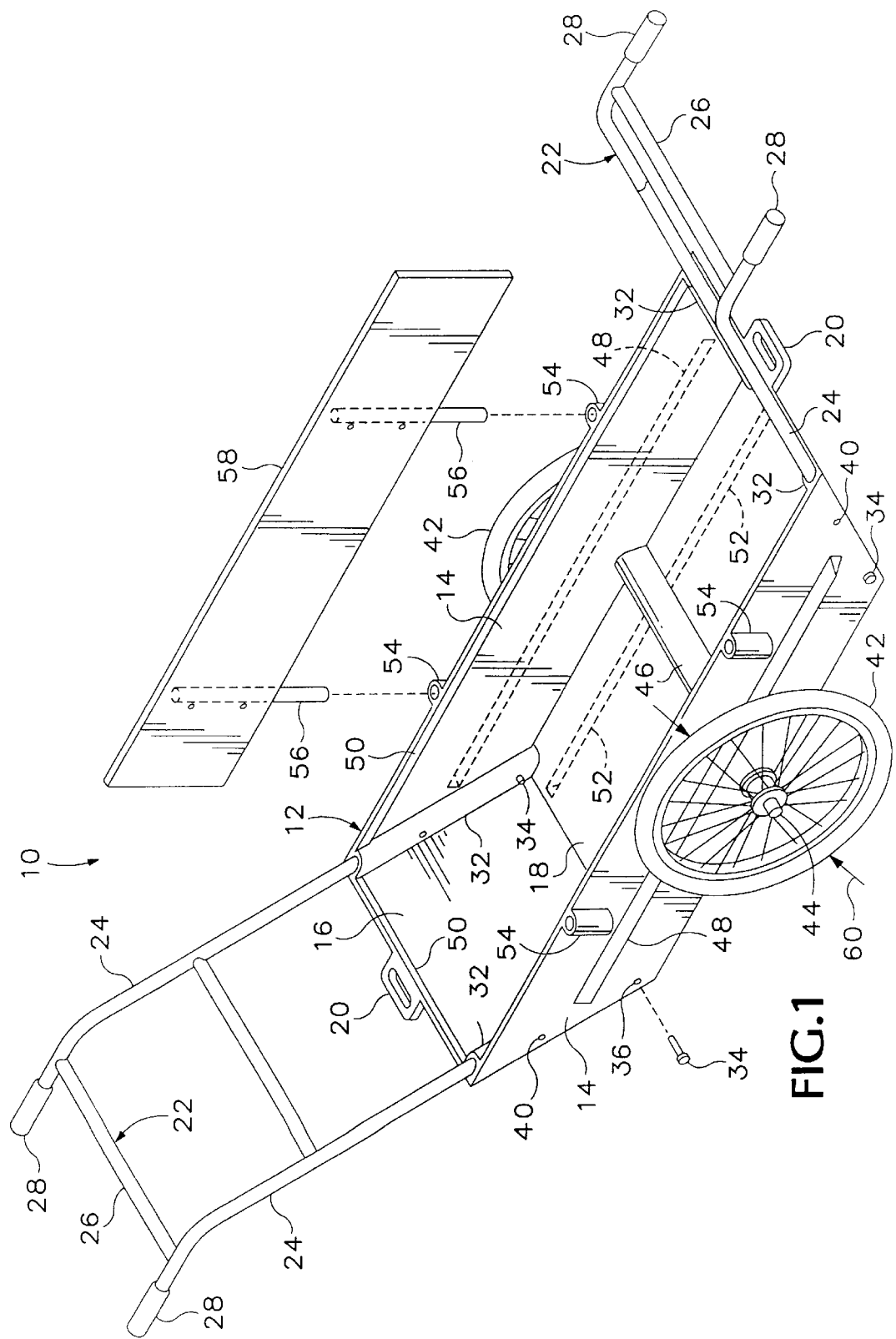
FIG. 1 is a perspective view of a portable utility cart embodying the present invention.

Referring now to the drawings which form a part of the disclosure herein, in FIG. 1, a portable utility cart 10 includes an elongate body 12 in the form of a box having a pair of symmetrically opposite upstanding sides 14, a pair of upwardly and outwardly sloping ends 16 extending transversely between the sides 14, and a generally planar bottom 18 extending horizontally and interconnecting the lower margins of the sides 14 and ends 16. A respective carrying handle or grip 20 is attached to the upper margin of each of the ends 16 and may extend horizontally outward from each end 16 to be used to lift the cart 10 when desired, as on uneven terrain or when placing the cart 10 into a vehicle. Preferably, the body 12 may be manufactured of a reinforced or high-strength plastic material molded as a single piece.

A pair of handles 22 each include a pair of parallel elongate side member portions 24 interconnected by at least one crossbar portion 26 forming an "H" shape. The side member portions are curved and a pair of generally horizontal grips 28 extend away from the body 12 beyond the cross bar 26 of each handle 22. The crossbar portion 26 keeps the upper ends and the grips 28 spaced properly and parallel with each other, and also serves as a convenient structure to lean one's body against, in moving the cart 10 over rough or steep terrain.

Referring also to FIGS. 2, 3, and 4, each of the elongate side members 24 has a mounting end 30 which is held in a selected one of a pair of positions within a respective handle receptacle 32 located within the sloping end corners of the body 12, defined by the intersections of the sides 14 with the ends 16. The handle receptacles 32 are tubular, extending thus along the slope of each of the ends 16, and the two handle receptacles 32 adjacent a given end 16 are parallel with each other.

When the cart is to be operated to carry only lightweight materials, it may be desirable and more convenient to operate it using only one of the handles 22, and the other handle 22 may be removed from the available handle receptacles 32 adjacent one of the ends 16 of the body 12.

As shown in FIG. 1 each of the handles 22 is located in a first position, in which the mounting ends 30 are located near the bottom 18 of the body 12, within the handle receptacles 32, and a fastener such as a pin 34 extends through locator holes 36 in the receptacles 32 and a corresponding locking bore 38 in the respective mounting end 30 (see FIG. 2) to keep the handles 22 in the first position with respect to the body 12. As shown in FIG. 2, the grips 28 are located at a convenient height 39 above the ground when the cart 10 is on level ground. A pair of upper locator holes 40 are provided to establish a higher second position for the handles 22, as shown in FIG. 4.

A pair of wheels 42 are mounted, using suitable bearings, on an axle 44 which extends transversely through the body 12 within an axle housing 46 extending across the upper surface of the bottom 18 of the body 12. The axle housing 46 is securely fastened to or included as part of the bottom 18 and is connected to the sides 14 to carry the weight of the body 12 and any load supported by the cart 10 and to transfer that load through the axle 44 to the wheels 42. The axle housing 46 is preferably shaped to merge gently into the upper surface of the bottom 18 as shown in FIG. 1, to prevent materials from being caught between the axle 44 and the bottom 18, and may be formed as an integral part of the body 12, merging into the bottom 18 and sides 14 as shown in FIGS. 1 and 3.

A respective stiffener 48 extends horizontally and longitudinally along each of the sides 14 to reinforce the sides 14. Additionally, a lip or rim 50 extends along the upper margin of each of the sides 14 to help make the sides 14 rigid. Such a lip or rim 50 may also extend along the upper margin of each end 16 to make the ends more rigid.

A pair of stiffeners 52 extend longitudinally, parallel with each other, along the underside of the bottom 18, spaced a small distance inward from the corner of the body 12 where the bottom 18 intersects with each of the sides 14. The stiffeners 52 thus extend downward beneath the bottom 18 and are available to serve as runners in an appropriate situation. The stiffeners 48 and 52 and rims 50 may be molded into the structure as additional material when the body 12 is manufactured of a molded plastic construction, as shown in FIGS. 1–5. Other than such longitudinally-extending stiffeners 52, as is shown in FIGS. 1–4 and 6, the bottom 18 is free from downward projections.

A pair of upright sockets 54 are located on the outer face of each of the sides 14 to receive a pair of side posts 56 attached to a side extension board 58, of which one is shown in FIG. 1. One of such side extension boards 58 can be mounted atop each of the sides 14, supported by the side posts 56 fitted within the sockets 54, to increase the capacity of the body 12 so that it can be used efficiently for carrying light bulky material such as leaves, prunings, and grass when the cart 10 is used during yard maintenance work about the house. The side posts 56 may, for example, be made of tubular metal material which is suitably strong and light in weight.

The wheels 42 are preferably of light weight yet of strong construction, with a suitably wide rubber or pneumatic tire to provide a large enough footprint so that the cart 10 can be operated on relatively soft soil without sinking in too deeply. For example, a rubber-tired heavy-duty wire-spoke or plastic bicycle-type wheel, equipped with a ball bearing hub of an appropriate size to fit onto the axle 44, is appropriate, and a conventional fastening system not shown in detail, such as a toggle pin or spring clip pin fitted in a cross bore through the axle 44, may be used to keep the wheels 42 on the axle 44. The wheels 42 may thus have a diameter 60 of about 20 inches, for example, so that the cart has a clearance 62 of about 9 inches, for example, beneath the stiffeners 52, as shown in FIG. 2.

As may be seen in FIG. 3, the body 12 has an internal width 64, between the rims 50 of the opposite sides 14, which is preferably in the range of about 15 to about 30 inches, and at least nearly as great as the diameter 60, so that there is room for the wheels 42 to be placed within the body 12, preferably flat on the bottom 18.

Figure 5:
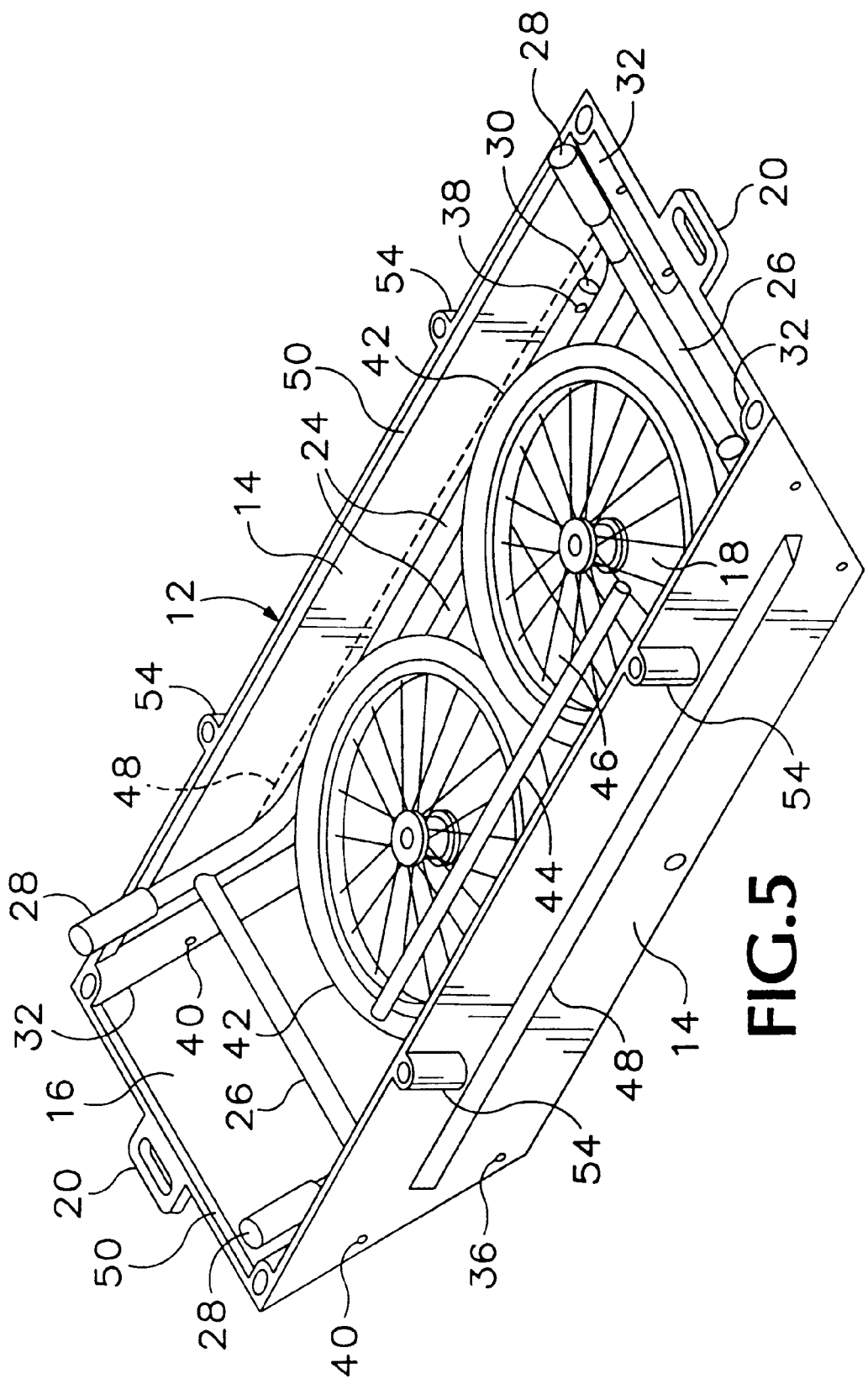
FIG. 5 is a perspective view of the portable utility cart shown in FIG. 1, configured for transportation to a remote location.

The bottom 18 has a length 66, and the body 12 an overall length 68 chosen to be small enough to fit within the space reasonably expected to be available in a motor vehicle, so that the cart 10 can be carried within such a space. The slope of the ends 16 and the length 66 of the bottom of the body 12 are chosen so that the length 70 of the handles 22 is about the same as or less than (along a straight portion extending from the mounting end 30 of the handles 22) the length 66 of the bottom 18 of the body 12. The portions of the handles 22 including the grips 28, which are preferably approximately horizontal as seen in FIG. 2, extend as a result generally parallel with the inner surface of the adjacent end 16 when the handle 22 is located within the body 12, between the sides 14 and ends 16, as shown in FIG. 5. The length 66, then, for example, may preferably be about 34 inches, while the overall length 68 may be about 56 inches, although greater or smaller overall length, for example within the range of 40 to 60 inches would also be appropriate, if desired. It is important, however, that the width 64 be great enough to receive the wheels 42, and preferable that the diameter 60 of each wheel 42 be large enough to provide ample clearance 62 (preferably at least about 8 inches) to permit movement of the cart 10 over rough terrain, in order for the cart to provide its greatest advantages in ease of use combined with portability.

When the cart 10 is used in difficult conditions as for carrying camp equipment, supplies, or firewood, or for carrying big game, it is foreseeable that swampy ground or snow or ice may be encountered and that the wheels 42 at times may be more hindrance than useful support for the body 12 and its cargo. In such situations, the wheels 42 may be removed from the axle 44 and the axle 44 may be removed from the axle housing 46. The bottom 18 of the body is generally planar and the stiffeners 52 extend beneath the bottom 18 and are useful as runners. The ends 16, being upwardly and outwardly inclined, help to raise the body 12 as it is urged longitudinally along a supporting surface of snow, ice, or soft or wet ground, while the sides 14, extending generally vertically upward from the bottom 18, do not oppose forward movement.

Preferably, when the wheels 42 are removed and the cart 10 is used as a sled as just described, the handles 22 are raised within the handle receptacles 32 into the second, upper position and the pins 34 are inserted to hold the handles 22 with their locking bores 38 aligned with the upper locator holes 40. When the wheels 42 have been removed this second position of the handles 22 places the grips 28 at the same height 39 above the ground supporting the body 12 as when the wheels 42 are used and the handles 22 are in the lower first position.

Either for storage or for transport of the cart 10, the wheels 42, axle 44, and handles 22 may be removed and stowed within the body 12 as shown in FIG. 5 to minimize the space required for the cart 10. It will also be understood that the side extension boards 58 will also fit within the body 12, although, for the sake of clarity, they are not depicted in FIG. 5.

As an alternative construction, the body 12 may be manufactured of sheet metal pressed to define the longitudinal stiffeners 48 and 52, as shown in section view in FIG. 6. The lip or rim 50 along the upper margins of the sides 14 may then be formed by folding the sheet material, for example, as shown in FIG. 6. It is anticipated, however, that such construction, while it may be more durable, will be heavier and more expensive, and that construction of molded plastic will therefore be preferred.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A convertible portable cart, comprising:
   (a) a load-bearing body having a pair of upwardly and outwardly sloping ends, a pair of opposite sides, and a generally planar bottom free of downward projections extending otherwise than primarily longitudinally with respect to said body and said body having a plurality of runners on said bottom to engage a surface to support said body;
   (b) a handle receptacle associated with a respective one of said ends of said body;
   (c) at least one handle mounted in said handle receptacle, said handle including a grip portion;
   (d) a fastener removably engaged in said handle receptacle and interconnecting said handle with said handle receptacle and keeping said handle in a selected one of a first position and a second position with respect to said handle receptacle;
   (e) a pair of large rotatable wheels removably mounted on opposite sides of said body, so as to support said body with sufficient clearance beneath said body for said cart to negotiate uneven terrain; and
   (f) said handle being removable from said receptacle and moveable in said receptacle between said first position and said second position when said fastener is disengaged, said second position being sufficiently higher than said first position, so that when said handle is in said second position and said wheels are removed and said runners engage said surface and support said body, said grip portion is located at about the same height above said surface supporting said body as when said handle is in said first position and said wheels support said body above said surface and provide said clearance beneath said body.

2. The cart of claim 1, including a transversely-extending axle housing located within said body and above said bottom.

3. The cart of claim 1 wherein said body has an interior width in the range of 15–30 inches and an overall length no greater than 60 inches.

4. The cart of claim 1 wherein said body is of sheet metal and includes a longitudinal bottom-stiffening corrugation.

5. The cart of claim 1 wherein said body is of molded plastic material.

6. The cart of claim 1 wherein said body is at least as long as said at least one handle.

7. The cart of claim 1 wherein each said wheel has a diameter and said body has an interior width at least as great as said diameter.

8. The cart of claim 1 including a socket associated with a side of said body and a post fitting in said socket attaching a side extension board to said side of said body.

9. The cart of claim 2 wherein said axle housing is integrated into said generally planar bottom of said body.

10. A convertible portable cart, comprising:
    (a) a load-bearing body having a pair of upwardly and outwardly sloping ends, a pair of opposite sides, and a generally planar bottom free of downward projections extending otherwise than primarily longitudinally with respect to said body and said body having a plurality of runners on said bottom to engage a surface to support said body;
    (b) a plurality of handle receptacles associated with said body;
    (c) at least one handle, said handle having a pair of generally parallel side member portions each including a mounting end which fits matingly in a respective handle receptacle located within said body adjacent an end thereof, said handle further including a cross bar portion interconnecting said pair of side member portions and, said handle including a grip portion;
    (d) a fastener removably engaged in each said respective handle receptacle and interconnecting said handle with each said respective handle receptacle and keeping said handle in a selected one of a first position and a second position with respect to each said respective handle receptacle;
    (e) a pair of large rotatable wheels removably mounted on opposite sides of said body, so as to support said body with sufficient clearance beneath said body for said cart to negotiate uneven terrain; and
    (f) said handle being moveable in said receptacle between said first position and said second position when said fastener is disengaged, said second position being sufficiently higher than said first position that when said handle is in said second position and said wheels are removed and said runners engage said surface and support said body, said grip portion is located at about the same height above said surface supporting said body as when said handle is in said first position and said wheels support said body above said surface and provide said clearance beneath said body.

11. The cart of claim 10 wherein said clearance beneath said generally planar bottom is at least 8 inches when said wheels are mounted on said body.

12. The cart of claim 10, including one said handle, and a respective handle receptacle therefore, at each end of said body.

13. A convertible portable cart, comprising:
(a) a load-bearing body having a pair of upwardly and outwardly sloping ends, a pair of opposite sides, and a generally planar bottom free of downward projections extending otherwise than primarily longitudinally with respect to said body, said cart also having a plurality of runners on said bottom to engage a surface to support said body and including a respective carrying grip located at each end of said body;
(b) a handle receptacle associated with a respective one of said ends of said body;
(c) at least one handle mounted in said handle receptacle, said handle including a grip portion;
(d) a fastener removably engaged in said handle receptacle and interconnecting said handle with said handle receptacle and keeping said handle in a selected one of a first position and a second position with respect to said handle receptacle;
(e) a pair of large rotatable wheels removably mounted on opposite sides of said body, so as to support said body with sufficient clearance beneath said body for said cart to negotiate uneven terrain; and
(f) said handle being moveable in said receptacle between said first position and said second position when said fastener is disengaged, said second position being sufficiently higher than said first position that when said handle is in said second position and said wheels are removed and said runners engage said surface and support said body, said grip is located at about the same height above said surface supporting said body as when said handle is in said first position and said wheels support said body above said surface and provide said clearance beneath said body.

14. A convertible portable cart, comprising:
(a) a load-bearing body having a generally planar bottom, a pair of upwardly and outwardly sloping ends and a pair of opposite sides;
(b) a pair of large rotatable wheels removably mounted on opposite sides of said body on an axle, so as to support said body with sufficient clearance beneath said bottom for said cart to negotiate uneven terrain, said axle extending through a transversely-extending axle housing located within said body and above said bottom; and
(c) said bottom including a pair of downwardly-projecting longitudinally-extending stiffeners in the form of runners and being free of downward projections extending otherwise than primarily longitudinally of said body, whereby said cart body is adapted for use as a sled with said runners engaging a surface to support said body when said wheels are removed.

15. The cart of claim 14 including at least one handle movably mounted to at least one end of said body, said at least one handle being moveable between a first, lower, position on said body and a second, higher, position on said body, said lower and higher positions being separated in a vertical direction by a distance corresponding to said clearance beneath said bottom when said wheels are mounted on said body.

16. The cart of claim 14 including two handles, each associated with a respective one of said ends of said body.

* * * * *